July 11, 1961
H. C. GLESMANN
2,991,862
FOOT OPERATED CONTROL MECHANISM FOR
PLURALITY OF CLUTCH ASSEMBLIES
Filed June 19, 1959
4 Sheets-Sheet 4
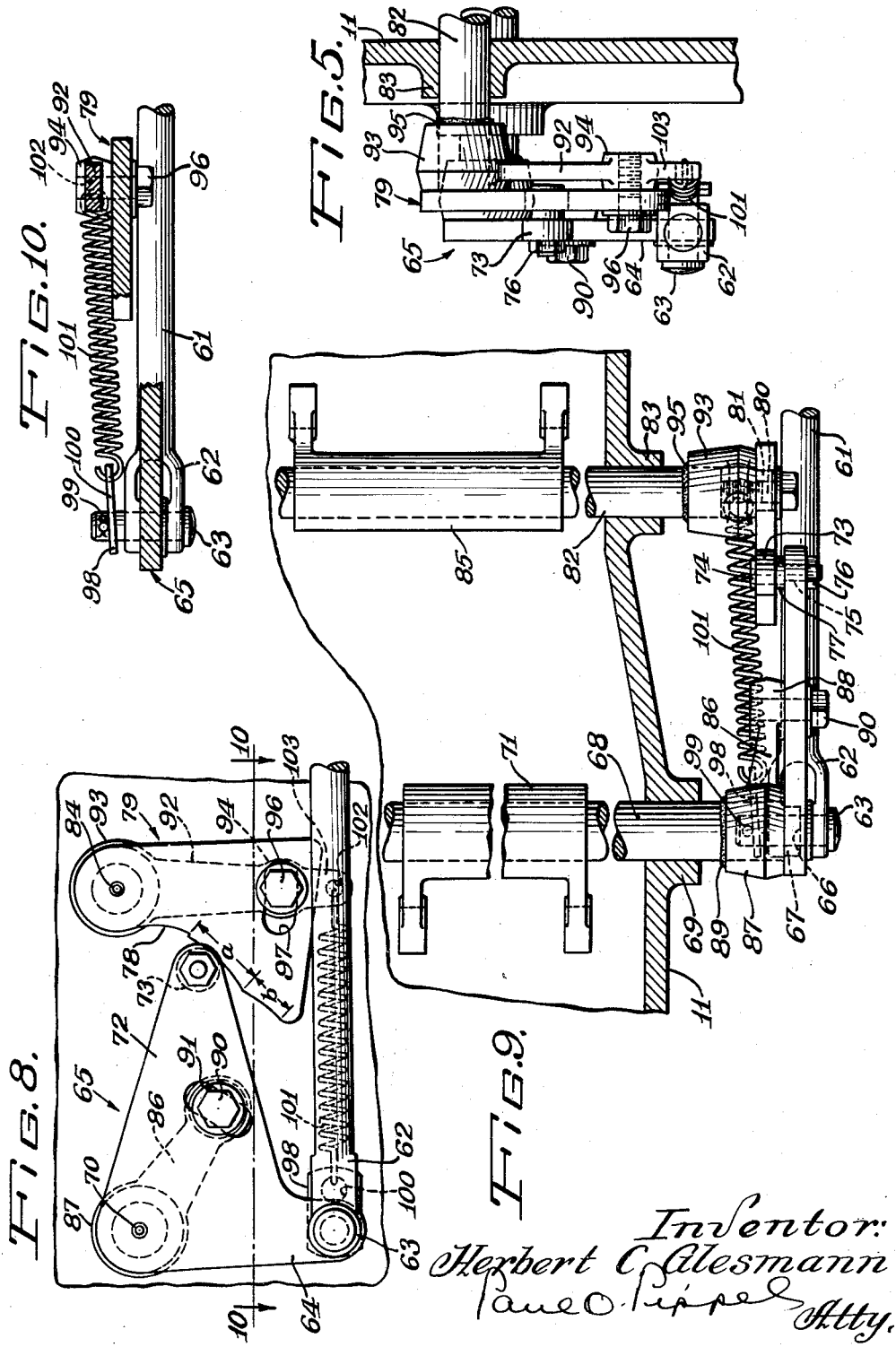
Inventor:
Herbert C. Glesmann
Paul O. Pippel Atty.

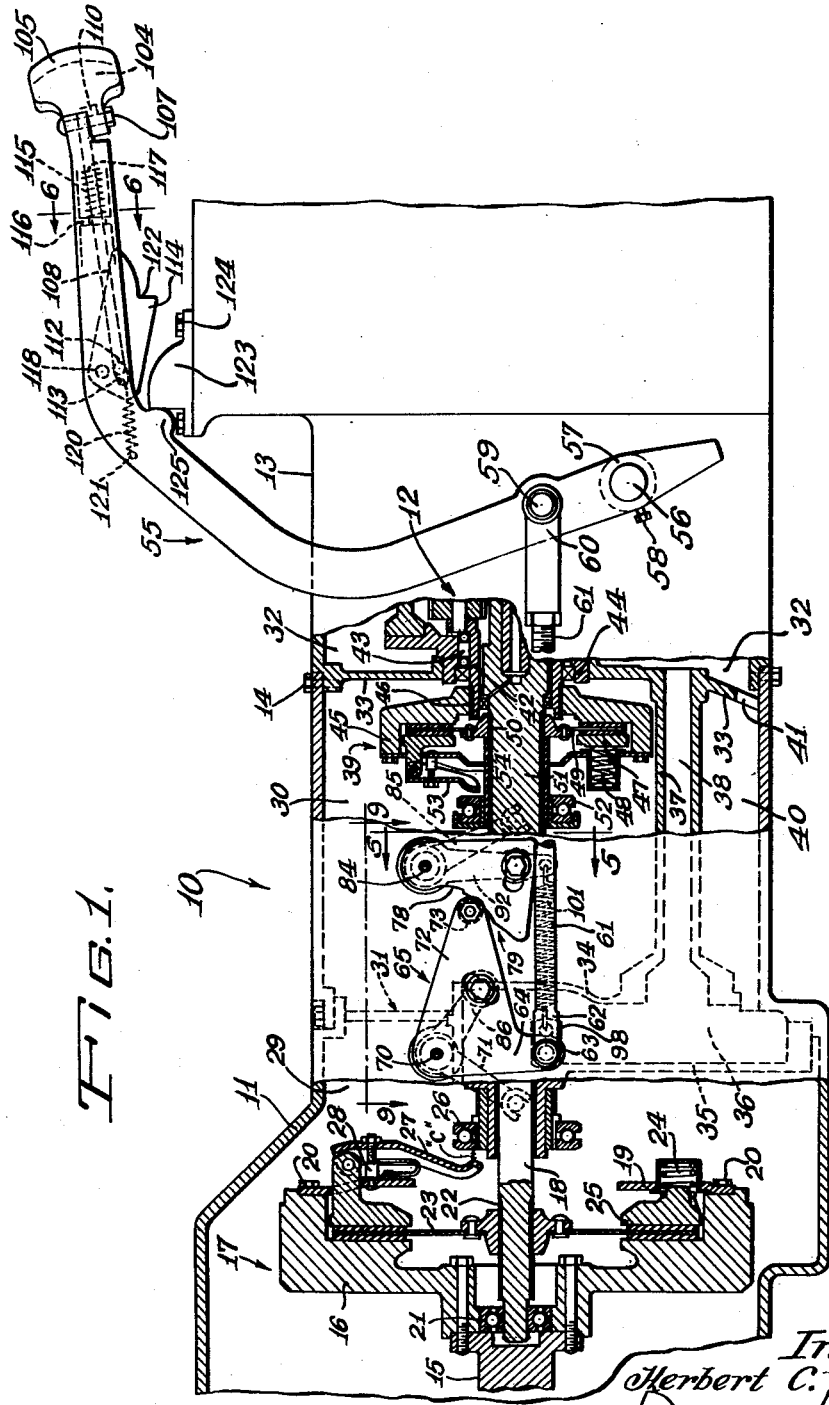

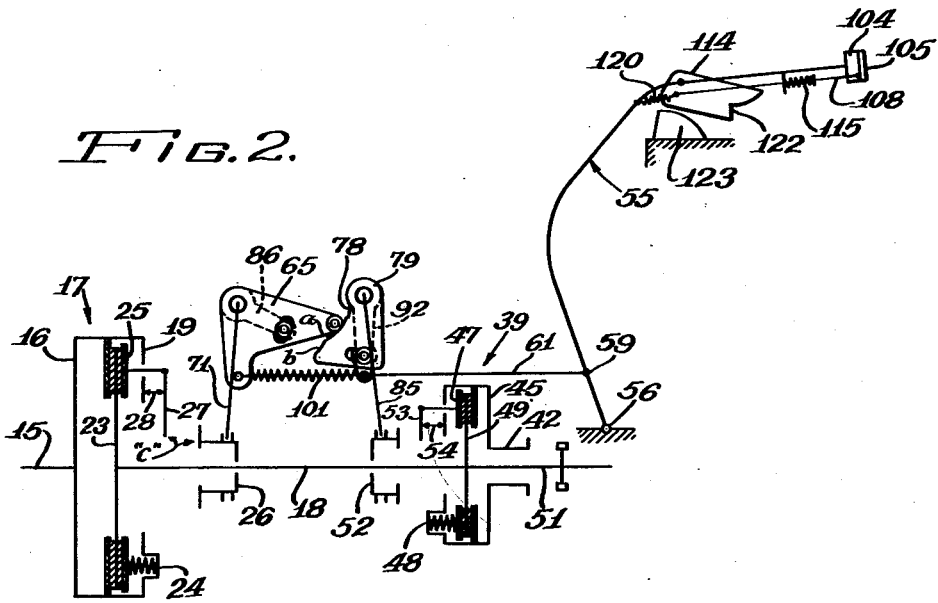
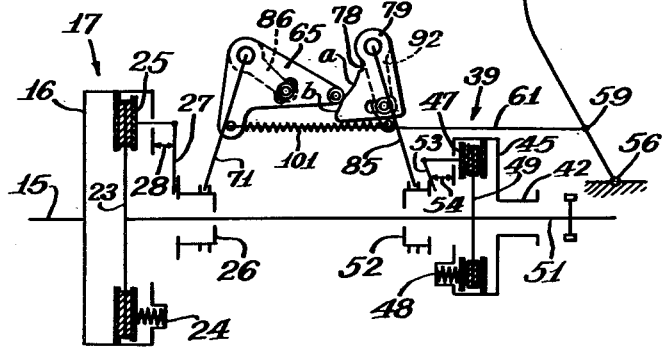

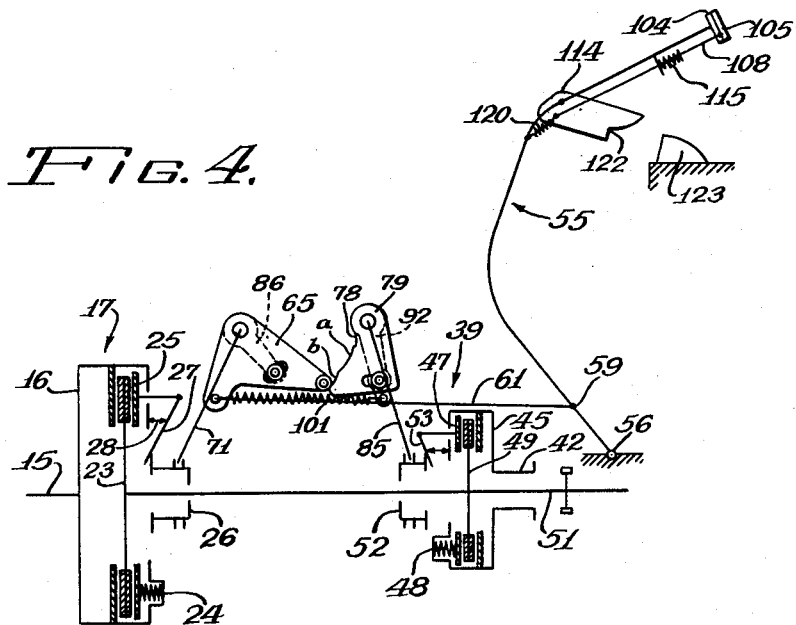
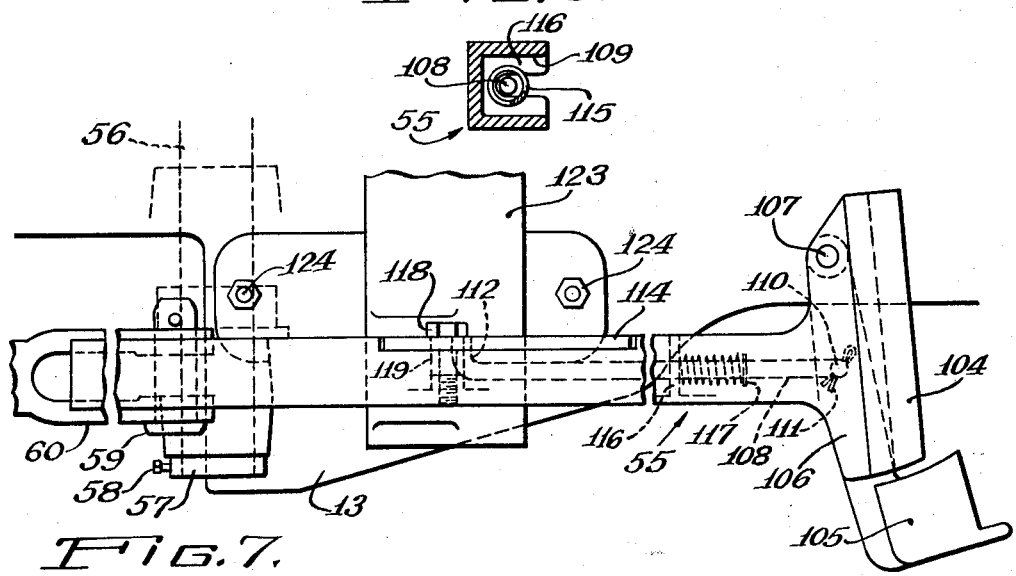

United States Patent Office 2,991,862
Patented July 11, 1961

2,991,862
FOOT OPERATED CONTROL MECHANISM FOR PLURALITY OF CLUTCH ASSEMBLIES
Herbert C. Glesmann, Naperville, Ill., assignor to International Harvester Company, Chicago, Ill., a corporation of New Jersey
Filed June 19, 1959, Ser. No. 821,438
7 Claims. (Cl. 192—48)

This invention relates generally to drive transmitting apparatus in vehicles, such as tractors, but is more specifically concerned with control mechanisms for actuating the clutch mechanisms forming a part of such apparatus.

The invention is more particularly related to the plural clutching assemblies usually employed, in vehicles, such as tractors, for independently controlling the transmission of drive alternatively through different gear trains from the power plant to the propelling wheels or ground engaging means of a vehicle. A tractor vehicle of the type that utilizes such a plurality of clutching mechanisms, and to which the present invention is peculiarly and highly adaptable, is illustrated and described in U.S. Patent No. 2,654,255, issued October 6, 1953 to Henry A. Ferguson et al. and assigned to the same assignee as the proposed invention. It will be understood, of course, that the presently proposed invention is not to be limited to the specific application and structural arrangement shown in that patent, since it is also readily susceptible of adaptation to other drive transmitting mechanisms.

The primary object of the present invention is to provide an easily operable and simplified control means, operable upon motivation by a single actuating member, for sequentially actuating a plurality of clutch mechanism for controlling the transmission of drive through different gear trains.

Another object is to provide an actuating mechanism that is actuable, through movement of a manually operated foot pedal member, for disengaging a normally engaged first clutch mechanism without disengaging a normally engaged second clutch operatively connected with the first clutch, and which mechanism, additionally, provides means for retaining said first clutch disengaged after the motivating force is removed from the foot pedal member.

A further object is to provide a linkage control mechanism wherein movement of an operating member to a first position causes associated linkage to effect disengagement of a normally engaged clutch and subsequently retains said clutch disengaged until manually released, and wherein subsequent continued movement of said operating member to a second position causes disengagement of another normally engaged clutch while still retaining the former clutch also disengaged.

An important object also is to provide a motion transmitting linkage mechanism, operable upon application of force to a foot-operated member thereof, for sequentially disengaging two normally engaged and operatively interconnected clutch mechanisms, and having lock-up or holding means operable with the linkage mechanism for retaining one of the clutch mechanisms disengaged after the force for motivating the foot-operated member is removed therefrom.

A more specific object is to provide, in a vehicle having a pair of coaxially disposed clutches arranged in back-to-back relation, and operatively interconnected in such manner that when both clutches are engaged drive is transmitted from the first through the second of said clutches and when the first thereof is engaged with the second disengaged drive from the former is by-passed around the latter, a clutch actuating mechanism wherein a manually operable pedal member is connected by pushrod means to a bell crank and cam assembly that has the cam thereof connected by an adjustable connection to a throwout bearing unit of said second clutch while the bell crank is connected by an adjustable connection to a throwout bearing unit of said first clutch, and wherein movement of said pedal is effective for sequentially disengaging firstly said second clutch and secondly said first clutch while retaining the said second clutch disengaged, and wherein the point of disengagement of each clutch may be independently adjusted by said adjustable connections between the bell crank and cam members and the respective throwout bearing units.

A general object of the invention is to provide an improved clutch actuating linkage means adaptable for actuating a plurality of normally engaged clutch mechanisms so as to either effect the sequential disengagement of said mechanisms or the disengagement of only one of said clutch mechanisms, while, additionally, being operative to effect disengagement retention of the first of said clutches after the motivating force is removed from the clutch actuating linkage means, The foregoing and other objects and advantages are attained by the present invention, various novel features of which will be apparent from the description herein and the accompanying drawings disclosing a preferred embodiment of the invention and will be more particularly pointed out in the appended claims. For a better understanding of the invention, reference may be had to the accompanying drawings, wherein:

FIGURE 1 is a longitudinal side elevational and sectional view of the clutch housing portion of a tractor vehicle to which the proposed control mechanism has been attached;

FIGURE 2 is a diagrammatic representation of the most essential elements of the clutching assembly of FIGURE 1 together with the proposed control mechanism, and showing the respective positions of the various control and clutch components thereof when both clutches are in their normally engaged positions;

FIGURE 3 is a view generally similar to FIGURE 2 but showing the respective positions of the various components when the control mechanism is actuated for effecting disengagement of one of the clutches;

FIGURE 4 is a view generally similar to FIGURES 2 and 3 but showing the respective positions of the various components when the operating member for the control mechanism has been moved sufficiently to effect disengagement of both clutches;

FIGURE 5 is a fragmentary vertical sectional view taken along the line 5—5 of FIGURE 1;

FIGURE 6 is a vertical sectional view taken on line 6—6 of FIGURE 1;

FIGURE 7 is a top plan view, in enlarged detail and partially broken away, of the operating pedal member together with the pedal pads thereof;

FIGURE 8 is a vertical, elevational view, in enlarged detail, of the bell crank and cam plate control element portions of the mechanism;

FIGURE 9 is a fragmentary horizontal sectional view, in enlarged detail taken along the line 9—9 of FIGURE 1 and omitting the clutching mechanisms; and FIGURE 10 is a fragmentary horizontal sectional view taken along the line 10—10 of FIG. 8.

In order to obtain a comprehensive understanding of the present invention, a preferred embodiment thereof is illustrated in the attached drawings which depict a generally conventional transmission drive mechanism, such as is more particularly illustrated and described in said U.S. Patent No. 2,654,255 to Henery A. Ferguson et al., into which the improved clutching control arrangement of the invention has been incorporated, while a description of the specific construction and operation of the clutching control arrangement follows.

By referring to the drawings, it will be noted that a plural clutching assembly, represented generally by the reference character 10, is enclosed within a housing or casing 11 that may be disposed in axial alignment with a torque amplifying unit shown fragmentarily at 12 and a generally conventional change-speed transmission structure (not shown) but both of which may be the same as those shown in the above noted Ferguson et al. Patent No. 2,654,255, and which, in turn, are enclosed by a housing or casing indicated at 13 that is secured to the clutch structure housing by suitable securing means, such, for instance, as by the cap screws 14 disposed at intervals therearound. The change-speed transmission is, of course, adapted for driving connection on the output side thereof, through a final drive assembly (not shown), with the propelling wheels or ground engaging means of a vehicle, such as a tractor, while the clutching structure on its input side is intended for driving connection with the power plant or engine of the vehicle into which the present invention may be incorporated, as is well understood, but since the representation of all these associated units or elements in the drawings is not essential to a proper and adequate understanding of the invention, for purposes of clarity and simplicity, they have not been included therein.

A crank shaft 15, which may be a continuation or an extension of the crank shaft of a suitable vehicle engine or power plant (not shown), has on the rear end thereof a flywheel or clutch driving member 16 that is operative through a conventional spring-loaded main friction clutch indicated generally at 17 for driving a driveshaft means such as 18 of the vehicle's power transmitting and dividing apparatus at engine speed. A back-up or cover plate member 19 of said clutch is rigidly secured at its perimeter by cap screws 20 to the rear side of the flywheel or driving member. The drive shaft component 18 of said drive shaft means is journalled at the forward end thereof by an anti-friction bearing unit 21 mounted in the flywheel 16, and has a splined connection at 22 with a driven disk member 23 of the clutch 17. A plurality of springs 24 spaced circumferentially of the back-up plate 19, and only one of which is shown in the drawings, normally bias or hold said clutch in an engaged position by forcing an annular pressure plate 25 against the rear face of the clutch driven disk member 23 whereby this latter disk is frictionally held between such pressure plate and the rear face of the flywheel or driving member 16. Release of the clutch disk 23 for operatively disengaging the shaft 18 from driving connection with the engine of the vehicle is accomplished conventionally by manual force applied against a throwout bearing unit 26 which, in turn, presses or urges the inner ends of the clutch levers or fingers 27 (only one of which is shown) forward, thereby displacing the outer ends of these levers and the pressure plate 25 rearwardly while said levers pivot upon their respective fulcrum elements 28 mounted on the back-up plate 19.

The casing or housing 11, which may be suitably supported on the vehicle as is well understood, accommodates the plural clutch assembly 17, together with other associated components as will presently be more fully explained, and includes a front compartment 29 separated from a central compartment 30 by a forward hollow bulkhead 31, and also includes a rear compartment 32 separated from said central compartment by a more rearward bulkhead 33. The forward bulkhead or partition 31 has a rear wall member 34 which cooperates with a concavo-convex cover plate 35 constituting a forward wall of this bulkhead to form an additional compartment that may function as a lubricant-containing compartment 36. A reinforcing or bracing wall member 37, which extends between the rearward wall 34 of said forward bulkhead and the rearward bulkhead 33, may provide a channel 38, adaptable for accommodating a power take-off shaft not shown, which channel communicates between the interior of the hollow bulkhead 31 and the space rearwardly of the bulkhead 33. The channel 38 is communicatively isolated from the central compartment 30 which, in turn, is provided as a dry compartment for housing a releasable clutch indicated generally at 39, of the generally conventional spring-loaded type, which, as utilized in the application illustrated herein, is in control of the torque amplifying unit shown only fragmentarily at 12 but which may be similar to the structure and arrangement specifically described and detailed in the Ferguson et al. Patent No. 2,654,255 referred to above. Lower parts of the reinforcing or bracing wall 37 may also embrace a lubricant-confining channel or passage 40 which, at its forward end, communicates with the lower part of the compartment 36 and which, through an opening 41 in the lower part of the rearward bulkhead 33, communicates with the more rearwardly compartment 32. The channel-forming bracing wall 37 communicatively isolates the lubricant-confining passage 40 from the central dry-clutch accommodating compartment 30.

The drive shaft 18 may, additionally, be journalled in suitable bearing units in the respective proximate bulkheads, as is well understood, but since the details of such constructions are not essential to a proper understanding of the invention they have not been shown in the drawings, thereby reducing the possibility of confusion therein.

A tubular extension, shown only in part at 42, of a portion of the torque amplifying unit, indicated fragmentarily at 12, constitutes a control element for said latter unit and is journalled within a portion of the rearward bulkhead 33 upon an anti-friction bearing unit 43, while an annular seal 44 may be provided to prevent leakage of lubricant along said extension into the dry central compartment 30. A drum-like body portion 45 of cultch 39 is splined to the tubular control element 42 at 46 and has constrained for rotation therewith a pressure plate 47 which is urged by springs, one of which is shown at 48, to press a disk 49 of said clutch between the pressure plate 47 and the clutch body driven member 45 thereof, and said disc, in turn, is splined at 50 to an extension 51 of the drive shaft 18. Clutch 39 is normally held engaged by the springs 48 but can be released at will by rearward axial movement of a clutch throwout bearing unit 52 and consequent pivoting of the clutch throwout levers or fingers 53 upon fulcrum members 54 for pulling the pressure plate 47 forwardly from the drumlike body portion 45. When the clutch 39 is engaged, the drive extension shaft 51 and the tubular control element 42 of the torque amplifying unit 12 will be constrained for unitary rotation, and when this clutch is disengaged, said drive shaft extension can rotate relatively to said tubular control element. While the structure of the secondary or auxiliary clutch 39 is somewhat conventional, the operation thereof in the prescribed arrangement is unique and novel because the disk element 49 is constituted as the driving member and, as such, transmits drive from the drive shaft member 51 to the drum-like body portion 45 which functions as a driven member, and then, in turn, transmits the drive to the tubular control element 42 of the torque amplifying unit 12.

In normal operation of the vehicle, the two clutches 17 and 39 will be engaged and a power transmitting connection will be established from the tubular control element 42, through only certain components of the torque amplifying unit 12, and the change-speed and final drive assemblies (not shown) of the vehicle, to the propelling wheels or ground engaging means thereof. However, when the secondary clutch 39 is released or disengaged, drive is then transmitted from the drive shaft 51, through all components of the torque amplifying unit 12, and the change-speed transmission and final drive assemblies, to the propelling wheels or ground engaging means at a reduced speed and amplified torque as more particularly explained in the above mentioned Ferguson et al. Patent No. 2,654,255. When the main clutch 17 is released or disengaged, drive from the crank shaft 15 through said main clutch to the drive shaft 18 is discontinued thereby interrupting drive to the wheels or ground engaging means of the vehicle.

In accordance with the more specific teachings of the present invention there is provided a clutch actuating or operating mechanism which is operable for sequentially disengaging the secondary clutch 39 and the main clutch 17 and, additionally, for retaining or holding, if desired, said secondary clutch disengaged after the initiating or motivating force that effected the operation of said mechanism has been removed therefrom.

A pedal member, fashioned with a channel-like cross-section body and indicated generally by the reference numeral 55, is pivotally mounted on a transverse shaft 56, that, in turn, is fixedly mounted in the opposite side walls (only one of which is shown) of the housing 13 and said pedal member is secured against displacement from said shaft by a retaining collar 57 and a set-screw 58 therein. Pivotally mounted on said pedal in the vicinity of the shaft 56, by suitable means such as the headed pin shown at 59, is a yoke-like member 60 the opposite end of which has threadably attached thereto a connecting push-rod 61, while the opposite end of said latter rod is provided with a bifurcated or clevis portion 62 that is pivotally mounted by a headed pin 63 on an arm 64 of a bell-crank member 65. The bell-crank, in turn, is rotatably piloted, by means of a recessed opening 66 in the bell-crank, on a reduced-section end portion 67 of a transversely extending rockshaft 68 journalled in bearings, such as shown at 69, that are disposed in the opposite side walls of the housing 11 (but only one of each of which is shown). A conventional lubricating fitting may be provided, as indicated at 70 to facilitate lubricating said bell-crank and rockshaft. Intermediate the ends of the rockshaft 68, and fixedly mounted in any well-known manner for rotation therewith, is a shifter-fork or operating lever 71 which engages the reciprocally mounted throwout bearing mechanism 26 of the main clutch 17 so that upon rotation of said operating lever the throwout bearing unit is forced into engagement with the respective operating fingers 27 of said clutch to effect the disengagement of the clutch, as is well understood in the art.

Another arm 72, of bell-crank 65, has mounted thereon, in cantilever fashion from the inward side thereof, a roller 73 which is rotatably carried by a stud bolt such as 74 that has a reduced-section end portion 75 thereon and which end portion is mounted in an opening in said bell-crank arm and is secured therein by a locking nut 76, while a spacing washer 77 may be provided, if desired, to space the edge of said roller from the inner face of said bell-crank arm. The roller 73, which may also be termed a follower member, is disposed to engage the camming surface or track 78 of a plate-like cam member 79 to effect the rotation of the cam plate, as will be better understood hereinafter. The cam plate 79, in turn, is rotatably piloted, by means of a recess opening 80 therein, on a reduced-section end portion 81 of a second transversely extending rockshaft 82 journalled in bearings, such as shown at 83, that are disposed in the opposite side walls of the housing 11 (but only one of each of which is shown). A conventional lubricating fitting may be provided as indicated at 84 to facilitate lubricating said cam plate and rockshaft 82. Intermediate the ends of the rockshaft 82, and fixedly mounted in any well-known manner for rotation therewith, is a shifter-fork or operating lever 85 which engages the reciprocally mounted throwout bearing mechanism 52 of the secondary clutch 39 so that upon rotation of said operating lever the associated throwout bearing unit is forced into engagement with the respective operating fingers 53 of said clutch to effect the disengagement of the clutch in conventional fashion.

An adjustably interlocking pick-up or motion-transmitting lever, indicated in its entirety by the numeral 86, has an enlarged hub 87 formed at one end and a smaller hub 88 at the other end thereof, and the enlarged hub portion is mounted on the transverse shaft 68 and constrained for rotation therewith by suitable well-known means such as the welds indicated at 89. The smaller hub 88 at the opposite end of said pick-up connecting lever has a threaded opening therethrough that receives a cap screw 90 the shank of which also passes through a slotted opening 91 in the bell-crank 65 while the head of the screw abuts the outer face of said bell-crank. By tightening said cap screw the inner side of face of the bell-crank 65 is brought into close frictional engagement with the adjusting lever 86 so that these two members are connected and may then rotate as a unit. In this manner it will be appreciated that rotational movement of the bell-crank 65, acting through the adjustable lever 86, will cause rotation of the transverse shaft 68 with resultant actuation of the main clutch 17.

Another adjustably interlocking pick-up or motion-transmitting lever, indicated by the reference numeral 92, has an enlarged hub 93 on one end and a smaller hub-like portion 94 proximate the opposite end thereof, and the enlarged hub portion is mounted on the transverse rockshaft 82 and constrained for rotation therewith by suitable well-known means such as the welds indicated at 95. The smaller hub portion 94 of this pick-up or connecting lever has a threaded opening therethrough that receives a cap screw 96 the shank of which also passes through a slotted opening 97 in the cam-plate member 79 while the head of the screw abuts the outer face of said plate. Tightening said latter cap screw pulls the inner side or face of the cam-plate 79 ino tight frictional engagement with the lever 92 so that these two members are connected and may then rotate as a unit. It will be evident that when the cap screw 96 holds these two members in tight frictional engagement that rotational movement of the cam-plate 79 may be transmitted, by way of the adjustable lever 92, to rockshaft 82 to effect the actuation of the secondary clutch 39.

After loosening the connecting cap screws 90 and 96 the adjusting levers 86 and 92 may be rotatively moved relative to their respective bell-crank or cam-plate members, and such movement may be utilized to provide an adjustably interlocking or connecting means for compensating for such factors as wear, free travel, clearance or the manufacturing inaccuracies frequently associated with mechanisms of the respective clutches.

A spring-anchoring plate-like bracket 98 is pivotally mounted on the headed pin 63 and disposed between one of the arms of the bifurcated portion 62 of the rod 61 and a retaining pin or cotter key 99 positioned in said mounting pin.

An opening 100 in the opposite end of the bracket 98 anchors a hooked-over end of a coil spring 101 whose opposite end is similarly anchored in an opening 102 provided in a depending extension 103 of the lever 92.

By referring particularly to FIG. 8 it will be seen that the camming or tracking surface 78 of the cam-plate 79 is not of uniform curvature throughout the full extent thereof. The portion of the track within the area indicated by the reference "a" in FIG. 8 defines an arcuate surface the center of which lies outside the axis of transverse shaft 68 when both clutches are in their engaged positions and while the cam-plate is disposed as indicated in said figure the curvature of this arcuate surface is such that when this cam surface is engaged by the roller 73 of bell crank 65, upon rotation of the latter, it will cause the cam-plate 79 to rotate counterclockwise, or in a direction reverse to that of the bell-crank, as viewed in FIG. 8. As this occurs both ends of the spring 101 move rapidly away from one another thus operating in effect to cause both end reactions of the spring to react against pedal member 55. This spring serves to hold the associated linkage in the position shown in FIG. 1 thereby maintaining the throwout bearings 52 and 26 spaced from their respective clutch levers. However, when the roller 73 reaches the end of the "a" portion of the cam track it then encounters a dwell portion, indicated at "b," wherein the radius of curvature is centered in the axis of the rockshaft 68, with these components as presently disposed, and hence further rotational movement of bellcrank 65 will not operate to displace or rotate the camplate 79 any further. This being the case the end of the spring 101 that is anchored to lever 92 will not be further rotatively displaced and only the opposite end of said spring i.e., that which is anchored in bracket 98, will continue being displaced. As a result the additional pedal pressure required to further rotate the bell-crank 65 will be proportionately decreased. It will be appreciated, of course, that the spring produces only a small portion of the total pedal effort since the clutches cause the main effort. This initial movement away from one another of both ends of the spring 101 accomplishes a further objective in that it allows the bell-crank 65 and its associated shifter-fork 71 to take up the play or free travel provided, as indicated at "c" (FIG. 1), in the mechanism of the main clutch 17 during the time the secondary clutch 39 is being disengaged, whereupon only a small amount of further pedal movement will be required to additionally disengage said main clutch while at the same time applying substantially no additional pressure to the mechanism of the already disengaged secondary clutch. In this manner the components of the secondary clutch are safeguarded against being overstressed or overshifted while the main clutch is being disengaged. This arrangement causes little or no effort resulting from the secondary clutch while operating the main clutch.

The pedal operating member 55 is fashioned with a main pad or pedal portion 104 at the upper end thereof which is adapted to accommodate the application of manual pressure or force by foot means thereto to rotate said member about the shaft 56. An auxiliary pedal member associated therewith comprises a pad or pedal portion 105 disposed alongside the main pedal pad 104 and has an arm 106 extending therefrom which is pivotally attached to or mounted on the main pedal member 104 by suitable mounting means such as the nut and bolt indicated at 107. A pull-up rod 108 disposed within the open channeled portion 109 of the pedal member 55 has a bent over end portion 110 thereof that is pivotally mounted in an opening in the auxiliary pedal arm 105, while suitable securing means, such as the cotter pin or clip 111, may be provided to prevent said end portion from accidentally being displaced or removed from the opening, and the opposite end of said pull-up rod has a turned-over end portion 112 that is positioned in a slotted opening 113 in a rotatable stop-plate 114. A coil spring 115 surrounding the pull-up rod 108 has one end thereof seated in abutting relation against a transverse wall portion or abutment 116, in the open channel 109 of the pedal arm 55, while the opposite end of this spring has a turned-over portion 117 that seats in a transverse opening extending through said pull-up rod. This spring is so dimensioned that when the auxiliary pedal is in a normal or non-operating position the pull-up rod 108 will be urged to its extreme rearward position or to the right as viewed in FIGS. 1 and 2 and attendant therewith the auxiliary pedal pad 105 will likewise be rotated to its rearwardmost position. The stop-plate 114 is pivotally mounted on a shoulder bolt 118 which, in turn, is threadably mounted in the pedal body 55 while a tube-like shoulder element 119 may be provided to securely position the plate 114 against transverse movement or displacement thereof relative to said pedal. A coil spring 120 has one end thereof hooked over and anchored in the slot 113 in the stop-plate 114 while the opposite end of said latter spring is hooked-over and anchored in an opening 121 proximate the edge of the pedal body 55, and an interlocking or holding notch 122 is provided at one corner of said stop-plate as indicated. In the normal or inoperative position of the auxiliary pedal pad 105 the spring 115 biases the pull-up rod 108 so that the rod extends to its rearwardmost position and in so doing overcomes the reaction of the weaker spring 120 and incident to such action rotates the stop-plate 114 to its uppermost or raised position (as shown in FIGS. 1 and 2). In this raised position said stop plate may clearly slide or pass over the stop bracket 123, mounted by suitable means such as the cap screws 124 on top of the housing 13, when the pedal member 55 is depressed or rotated. An enlarged bumper-like portion or protuberance 125 on the pedal member 55 serves as a movement limiting means and is positioned to abut against the stop bracket 123 to limit the rearward movement of said pedal member when the manual actuating force is removed therefrom.

*Operation*

In order to better understand the operation of the proposed control or actuating mechanism let us assume first that both of the clutches 17 and 39 are initially disposed in their normally engaged positions which causes drive to be transmitted from the engine's crankshaft 15 through the clutches and the final drive assembly (not shown) to the ground engaging means of the vehicle so equipped. In which case the components of the clutches and control mechanisms will be positioned, as shown in FIGS. 1, 2, and 8, with the movement limiting member or bumper means 125 of the pedal member 55 resting against or engagingly abutting the stop bracket 123. Assume now it is desired to change from this initial position to one that will effect the disengagement of the secondary clutch 39 and thereby include all of the torque amplifying elements of the mechanism 12 in the power train established between the power plant and the ground engaging means of the vehicle and, additionally, thereafter retain said clutch disengaged. One way in which this may be accomplished is for the operator to place a foot on the auxiliary pedal pad 105, which in its normal position is located rearwardly of the pedal main pad 104 and may be engaged without also engaging the main pad, and then apply a pressure thereto, whereupon the pull-up rod 108 is urged forwardly causing the spring 115 to be compressed against the abutment partition 116, of the pedal 55, while said pedal, in turn, is restrained against movement by the reaction of spring 101. This action permits the smaller spring 120 to take over the control of and pre-set or trigger the release of the stop-plate 114 by rotating or pivoting said plate downwardly about the cap screw 118 to a lowered position. After this movement the auxiliary pad 105 and the main pad 104 will be substantially in transverse alignment and the operator can then simply apply sufficient pressure to the main pedal pad 104, while at the same time continuing to hold the auxiliary pad 105 depressed, to cause the pedal member 55 to rotate about its pivot at 56 while carrying with it the stop-plate 114 which, having been rotated downwardly, will be in position to override or slide over the stop bracket 123 after which the notch 122 in said plate will engage the edge of said bracket. It will be appreciated, of course, that the auxiliary pedal pad 105 does not have to be engaged prior to the engagement of the main pad 104 to effect the holding action, but may be subsequently engaged, such as after the second clutch 39 has been disengaged, without deviating from any of the novel concepts of the present invention.

As the pedal member 55 rotates and moves forwardly it carries with it the connecting push-rod 61 which, being pivotally connected to the bell-crank 65, causes said bell-crank to rotate clockwise about its axis on the transverse shaft 68 and attendant thereto the roller 73, being in motion-transmitting engagement with the "a" portion of the track or cam surface 78 of cam-plate 79, will effectuate the counterclockwise rotation of said cam-plate about its axis on the transverse shaft 82. Since the cam-plate 79, by virtue of its connecting or interlocking relation through the cap screw 96, is constrained for rotative movement with the adjustably interlocking lever 92 affixed to the transverse shaft 82, the latter shaft will be correspondingly rotated in a counterclockwise direction about its axis, and as said shaft rotates it carries with it the attached cluch shifter-fork 85. Since the latter shifter-fork or operating lever means is in operating engagement with the throwout bearing unit 52, the initial movement thereof will effectively take up any free-travel, play or clearance provided in the mechanism, after which the clutch fingers 53 will be engaged by said throwout unit to effect the disengagement of the clutch 39. When the bell-crank 65 has been rotated sufficiently to position the roller 73 at the bottom end of the "a" portion of the cam track 78 the secondary clutch 39 will have been completely disengaged and the components of the assembly will be positioned as shown in FIG. 3. If desired, the clutching control or actuating mechanism may now be maintained in this latter position by merely removing pressure from both pads of the pedal member 55, whereupon said pedal member will then be retained against further releasing movement by the notch 122 in stop plate 114 which is disposed in a barrier-type or a motion-limiting (in one direction) relation with the stop bracket 123, as seen in FIG. 3.

Assume next it is desired to also disengage the main clutch 17 without disturbing the presently disengaged position of the secondary clutch 39. In this event the pedal member 55 is further rotated by the application of suitable pressure simultaneously to both the main pad 104 and auxiliary pad 105 thereof, thus causing the push-rod 61 to further rotate the bell-crank 65 in a clockwise direction about its axis on the transverse shaft 68, and since substantially all the free-travel and clearance (indicated at "c" in FIG. 1) in the respective throwout and clutch mechanisms will have been taken up by the previous rotative movement of the bell-crank, the throwout bearing unit 26 is now in position to engage the clutch fingers 27 and to start the disengagement of the main clutch 17. As the bell-crank is further rotated to effect the complete disengagement of the latter clutch the roller 73 thereof comes into engagement with the "b" or dwell portion of the cam track 78 which then functions to limit any further tendency to rotate the cam-plate 79 about its axis. By the time said roller has approached the bottom end of said dwell portion of the cam track the main clutch 17 will also have been completely disengaged, and this position of the clutches and control mechanism, as shown in FIG. 4, will subsequently be maintained so long as sufficient force or pressure to do so is applied against the pedal member 55.

In order to effect a re-engagement of the main clutch 17, from the position illustrated in FIG. 4, the pressure on the pedal member 55 is relieved sufficiently to allow the reactive force of the springs 24, in the clutch 17, in cooperation with the spring 101 to urge the push-rod 61 and its attached pedal member 55 rearwardly, thereby rotating the bell-crank 65 counterclockwise from the position shown in FIG. 4 and attendant thereto causing the shifter-fork or operating lever 71 to slide the throwout bearing unit 26 away from its respective finger elements 27, after which the springs 24 reactively operate to effect the engagement of said clutch. However, since the stop-plate 114 will still be triggered to engage the stop bracket 123 so long as pressure is maintained on the auxiliary pad 105, the pedal member 55 will not be permitted to rotate sufficiently, without further action on the part of the operator, to also accomplish reengagement of the secondary clutch 39. This is accomplished by the operator applying sufficient pressure to the pedal member 55 to move the notch 122, of stop-plate 114, away from its holding or stopping engagement with the stop bracket 123, thereby permitting the reactive force of the spring 115 to overcome the weaker spring 120 and rotate the pull-up rod 108 rearwardly and attendant therewith rotatively raise the stop-plate 114. Now when the operator completely releases pressure from the pedal member 55 the spring 101 continues to urge said pedal member rearwardly, with the stop-plate 114 riding or sliding over the stop bracket 123, until the bumper 125 of the pedal member engages said stop bracket. During this latter movement, as the spring 101 urges the arm of the bell-crank 65 toward the cam-plate 79, the roller 73 is again brought into engagement with the "a" portion of the cam track 78 thus permitting the cam-plate to start rotating sufficiently to permit the associated shifter-fork or operating lever 85 to slide the throwout bearing unit 52 away from engagement with the finger elements 53 thereby allowing the springs 48 to become reactive and again effect the engagement of the secondary clutch 39.

It should now be apparent that a novel multiple clutching control or actuating assembly has been shown and described and that such assembly offers certain advantages such as, an improved appearance for the vehicle so equipped, a tractor vehicle that is easier to mount and dismount because of a reduction in the number of obstacles on the operator's platform, reduced operator fatigue, an improved centralized control that performs a plurality of control operations, a control that is inexpensive to fabricate and maintain, and an improved psychological aspect because of providing a foot rather than a hand operated control thereby leaving the hands free for other activities. It is to be understood, of course, that changes may be made in the construction shown herein without departing from the spirit of the invention or the scope thereof as defined in the appended claims.

What is claimed is:

1. In a drive transmitting mechanism of the class described: a first clutch having means normally biasing said first clutch to an engaged position; a second clutch having means normally biasing said second clutch to an engaged position; said clutches being coaxially arranged and spaced axially from one another; a separate throwout mechanism for each clutch and adapted for engagement with its respective clutch to effect the disengagement thereof; clutch actuating means including separate members operatively connected one to each of said throwout mechanisms and having said separate members provided with portions engageable with one another for transmitting actuating motion therebetween, and a manually operative push-rod means connected to one of said members and operable for moving said separate members so as to effect disengagement of first one clutch mechanism and then the other clutch mechanism, and means associated with said push-rod means for maintaining the first clutch disengaged when the motivating force is removed from said push-rod.

2. In a drive transmitting mechanism of the class described: a first clutch having means therein normally biasing said first clutch to an engaged position; a second clutch having means normally biasing said second clutch to an engaged position; a casing enclosing said clutches in a coaxially arranged and spaced relation to one another therewithin; a separate throwout bearing unit for each clutch adapted upon axial movement for engagement with a respective clutch to effect the disengagement thereof; separate operating lever means for each clutch rotatively carried by said casing and operative for individually engaging a respective throwout bearing unit to effect axial movement thereof; clutch actuating means including a cam plate member having a single cam surface thereon and being rotatively carried by said casing, and a bell-crank member rotatively carried by said casing and having a portion carried thereon that engages the cam surface of said cam plate member; individual connecting means connecting respectively said cam plate to the operating lever means of said second clutch and said bell-crank to the operating lever means of said first clutch, and having each of said connecting means adjustable to vary the relative axially displaced positions of said throwout bearing units with respect to the rotatively displaced positions of the respective cam plate and bell-crank members; operating linkage means connected to said bell-crank and operative upon the application of force thereto for rotating said bell-crank and cam plate members in opposite directions so as to effect the sequential disengagement of said clutches; resilient means connected between said bell-crank and the individual connecting means connected with said cam-plate member and reactively disposed so as to normally oppose the rotation of said members in the direction that causes disengagement of said clutches; and holding means cooperative between said operating linkage means and said casing for holding said latter means in position to retain disengagement of said second clutch.

3. In a drive transmitting mechanism of the class described: a first clutch having means therein normally biasing said first clutch to an engaged position; a second clutch having means normally biasing said second clutch to an engaged position; a casing enclosing said clutches in a coaxially arranged and spaced relation to one another therewithin; a separate throwout bearing unit for each clutch adapted upon axial movement for engagement with a respective clutch to effect the disengagement thereof; clutch actuating means manually operative for sequentially effecting the disengagement of said actuating means including a plate member rotatively carried on said casing and having a cam track formed thereon and being operatively connected to the throwout bearing unit of said second clutch, a cam follower member rotatively carried on said casing and being operatively connected to the throwout bearing unit of said first clutch and having a cam-engaging portion thereof adapted to engagingly contact said cam track for transmitting movement between said members; said cam track having a first arcuately-shaped portion in which the center of said arc lies outside the axis about which said cam follower member rotates, and a second arcuately-shaped portion in which the center of said latter arc coincides with the axis about which said cam follower rotates, and having said first and second portions contiguous; operating means including a push-rod connected to said cam follower member and operative upon application of force thereto for rotating said cam follower member and causing the cam-engaging portion thereof to initially engage the first portion of said cam track to effect the rotation of said plate member and incident thereto the disengagement of said second clutch, and for subsequently causing the cam-engaging portion of said cam follower to engage the second portion of said cam track to effect the disengagement of said first clutch while maintaining said second clutch disengaged; resilient means interconnecting said cam follower and plate members and reactively disposed so as to normally oppose the clutch disengaging movements of said latter members; and holding means cooperative between said operating means and said casing for holding said push-rod in position to retain said second clutch in a disengaged position.

4. In a drive transmitting mechanism of the class described: a first clutch having means therein normally biasing said first clutch to an engaged position; a second clutch having means therein normally biasing said second clutch to an engaged position; a casing enclosing said clutches in a coaxially arranged and spaced relation to one another therewithin; a separate throwout bearing unit for each clutch adapted upon axial movement for engagement with a respective clutch to effect the disengagement thereof; clutch actuating means manually operative for sequentially effecting the disengagement of said clutches and including a cam member fashioned with only one cam surface thereon and being rotatively carried by said casing and operatively connected to the throwout unit of said second clutch, and a single cam follower member rotatively carried by said casing and operatively connected to the throwout unit of said first clutch and operatively engageable with the cam surface of said cam member for transmitting movements between said follower and cam members; operating means including a push-rod connected at one end to said follower member, and a pedal member pivotally mounted on said casing and connected to the other end of said push-rod and operative upon application of force in one direction to the pedal member for rotating said follower and cam members to effect first the disengagement of said second clutch and then the disengagement of said first clutch while said second clutch is still disengaged; resilient means interconnecting said follower and cam members and reactively disposed so as to normally oppose the clutch disengaging movements of said latter members; releasable holding means operative upon movement of said operating means for retaining said second clutch in a disengaged position and including an abutment on said casing, a latch element pivotally mounted on said pedal member, trigger means carried by said pedal member and including means operative into one position for biasing said latch element to a raised position and into another position that overcomes the biasing action thereof and permits rotation of said latch element, and resilient means connected between said latch and pedal members and reactive after the biasing action of said trigger means is overcome for rotating said latch into a lowered position for engagement with said abutment whereby movement of said operating means in one direction is restricted and incident thereto said second clutch is retained disengaged.

5. In a drive transmitting mechanism of the class described: a first clutch having means therein normally biasing said first clutch to an engaged position; a second clutch having means therein normally biasing said second clutch to an engaged position; a casing enclosing said clutches in a coaxially arranged and spaced relation to one another therewithin; a separate throwout bearing unit for each clutch adapted upon axial movement for engagement with a respective clutch to effect the disengagement thereof; clutch actuating means manually operative for sequentially effecting the disengagement of said clutches and including a cam member fashioned with only one cam track thereon and being rotatively carried by said casing and operatively connected to the throwout unit of said second clutch, and a single cam follower member rotatively carried by said casing and operatively connected to the throwout unit of said first clutch and operatively engageable with the track of said cam member for transmitting movements between said follower and cam members; operating means including a push-rod connected at one end to said follower member, and a pedal member pivotally mounted on said casing and connected to the other end of said push-rod and operative upon application of force in one direction to the pedal member for rotating said follower and cam members to effect first the disengagement of said second clutch and then the disengagement of said first clutch while said second clutch is still disengaged; resilient means interconnecting said follower and cam members and reactively disposed so as to normally oppose the clutch disengaging movements of said latter members; holding means operative upon movement of said operating means for retaining said second clutch in a disengaged position and including an abutment on said casing, a latch pivotally mounted on said pedal member, biasing means normally reactively urging said latch out of position for engagement with said abutment, release means connected between said pedal and latch members operative upon application of force thereto for overcoming the biasing action of said biasing means, resilient means connected between said latch and pedal members and reactive after said biasing means is overcome for rotating said latch into position for engagement with said abutment whereby movement in one direction of said operating means is restricted and incident thereto said second clutch is retained disengaged.

6. In a drive transmitting mechanism of the class described: a first clutch having means therein normally biasing said first clutch to an engaged position; a second clutch having means therein normally biasing said second clutch to an engaged position; a casing enclosing said clutches in a coaxially arranged and spaced relation to one another therewithin; a separate throwout bearing unit for each clutch adapted upon axial movement for engagement with a respective clutch to effect the disengagement thereof; clutch actuating means manually operative for sequentially effecting the disengagement of said clutches and including a cam member rotatively carried by said casing and operatively connected to the throwout unit of said second clutch, and a cam follower member rotatively carried by said casing and operatively connected to the throwout unit of said first clutch and operatively engageable with said cam member for transmitting movements between said follower and cam members; operating means including a push-rod connected at one end to said follower member, and a pedal member pivotally mounted on said casing and connected to the other end of said push-rod and operative upon application of force in one direction to the pedal member for rotating said follower and cam members to effect first the disengagement of said second clutch and then the disengagement of said first clutch while said second clutch is still disengaged; resilient means interconnecting said follower and cam members and reactively disposed so as to normally oppose the clutch disengaging movements of said latter members; holding means operative upon movement of said operating means for retaining said second clutch in a disengaged position and including an abutment supported by said casing, a latch pivotally mounted on said pedal member, an auxiliary pedal element pivotally mounted on said pedal member and connected by an auxiliary push-rod to said latch, biasing means reactively disposed between said pedal member and said auxiliary rod and normally biasing said latch to a raised position, and having said auxiliary pedal element operative upon application of force thereto for overcoming the biasing action of said biasing means so as to permit rotation of said latch, and resilient means connected between said latch and said pedal member that is reactive after said biasing means has been overcome for rotating said latch into a lowered position for engagement with said abutment whereby movement of said operating means in one direction is restricted and concomitant therewith said second clutch is retained in a disengaged position.

7. In a drive transmitting mechanism adapted for use with a tractor vehicle, the combination, conprising: an engine shaft; a drive shaft disposed coaxially with said engine shaft; a first clutch having a driving body member constrained for rotation with said engine shaft, a driven disk element drivingly connected to said drive shaft, and means normally urging said disk element into engagement with said driving member for rotation therewith; a second clutch spaced axially from said first clutch and having a driving disk element connected to said drive shaft for rotation therewith, a driven body member adapted for concentric rotation relative to said drive shaft, and means normally urging said driven body member into engagement with said driving disk element for rotation therewith; clutch actuating means including a separate throwout mechanism for each clutch reciprocally and concentrically mounted with respect to said drive shaft and adapted upon axial movement thereof for engagement with a respective clutch body member, individual and rotatively mounted elements operatively connected one each with a throwout mechanism and operatively engageable with one another, operating lever means connected to one of said individual elements and operative upon application of force in one direction thereto for rotating said latter elements in opposite directions and incident thereto causing axial movement of the throwout mechanisms so as to effect subsequent sequential disengagement of said clutches, resilient means interconnecting said individual elements and normally biasing said latter elements to oppose the rotation thereof in the directions that cause disengagement of the clutches, and holding means associated with said operating lever means for maintaining one of the clutches disengaged after the operative force is removed from said latter means.

References Cited in the file of this patent

UNITED STATES PATENTS

| 403,546 | McMahon | May 21, 1889 |
| 2,010,288 | Bartelme | Aug. 6, 1935 |
| 2,568,454 | Laverents | Sept. 18, 1951 |
| 2,880,833 | Stevenson et al. | Apr. 7, 1959 |
| 2,899,034 | Hubert | Aug. 11, 1959 |

FOREIGN PATENTS

| 252,114 | Great Britain | Oct. 5, 1925 |
| 616,892 | Great Britain | Jan. 28, 1949 |